(12) United States Patent  
Lombrozo

(10) Patent No.: US 11,305,740 B2
(45) Date of Patent: Apr. 19, 2022

(54) AIR KNIFE FOR SENSOR CLEARING

(71) Applicant: Waymo LLC, Mountain View, CA (US)

(72) Inventor: Peter Craig Lombrozo, Scotts Valley, CA (US)

(73) Assignee: Waymo LLC, Mountain View, CA (US)

( * ) Notice: Subject to any disclaimer, the term of this patent is extended or adjusted under 35 U.S.C. 154(b) by 159 days.

(21) Appl. No.: 15/855,327

(22) Filed: Dec. 27, 2017

(65) Prior Publication Data

US 2019/0193688 A1 Jun. 27, 2019

(51) Int. Cl.
*B60S 1/56* (2006.01)
*B08B 3/02* (2006.01)
*B08B 3/10* (2006.01)
*B60S 1/54* (2006.01)
*B08B 5/02* (2006.01)

(52) U.S. Cl.
CPC ............... *B60S 1/56* (2013.01); *B08B 3/022* (2013.01); *B08B 3/10* (2013.01); *B08B 5/02* (2013.01); *B08B 5/023* (2013.01); *B60S 1/54* (2013.01); *B08B 2203/007* (2013.01)

(58) Field of Classification Search
CPC . B60S 1/54; B60S 1/56; B60S 1/0848; G02B 27/0006; B05C 11/06
See application file for complete search history.

(56) References Cited

U.S. PATENT DOCUMENTS

| 5,605,055 | A | 2/1997 | Salgado |
| 6,077,361 | A | 6/2000 | Glenn |
| 6,138,319 | A | 10/2000 | Benoit |
| 6,202,934 | B1 | 3/2001 | Kamiya et al. |
| 6,290,361 | B1 | 9/2001 | Berzin |
| 7,461,797 | B2 * | 12/2008 | Bhat ...................... B05B 1/005 239/455 |
| 8,033,899 | B2 | 10/2011 | Ichikawa et al. |
| 2003/0155001 | A1 * | 8/2003 | Hoetzer ................. B60S 1/0822 134/37 |

(Continued)

FOREIGN PATENT DOCUMENTS

| JP | 2011155468 A | 8/2011 |
| JP | 2011240913 A | 12/2011 |

(Continued)

OTHER PUBLICATIONS

Narayan, A., "Dyson's bladeless fan: worth the hefty cost?", Oct. 21, 2009, [retrieved on Aug. 28, 2015], <URL: http://content.time.com/time/health/article/0,8599,1931455,00.html>.

(Continued)

*Primary Examiner* — Joseph L. Perrin
*Assistant Examiner* — Irina Graf
(74) *Attorney, Agent, or Firm* — Botos Churchill IP Law

(57) ABSTRACT

This technology relates to a system for clearing sensors. The system may include an air knife, a sensor cover, and a sensor motor. The sensor cover may be configured to house one or more sensors. The sensor motor may be used to rotate the sensor cover. The air knife may be configured to clear the sensor cover of debris by providing a pressurized stream of fluid against the sensor cover as the sensor motor rotates the sensor cover.

14 Claims, 13 Drawing Sheets

(56) References Cited

U.S. PATENT DOCUMENTS

| | | | |
|---|---|---|---|
| 2008/0245903 A1* | 10/2008 | Loth | B05C 11/06 239/548 |
| 2011/0073142 A1 | 3/2011 | Hattori et al. | |
| 2012/0273070 A1* | 11/2012 | Freers | F26B 21/004 137/565.01 |
| 2013/0092758 A1* | 4/2013 | Tanaka | B60S 1/52 239/284.1 |
| 2013/0300869 A1* | 11/2013 | Lu | B60R 1/00 348/148 |
| 2015/0040953 A1* | 2/2015 | Kikuta | B60S 1/52 134/123 |
| 2015/0203077 A1* | 7/2015 | Gokan | B60S 1/0848 134/36 |
| 2016/0121855 A1 | 5/2016 | Doorley et al. | |
| 2017/0036650 A1* | 2/2017 | Hester | G02B 13/04 |
| 2017/0151933 A1* | 6/2017 | Doorley | B60S 1/56 |
| 2017/0259788 A1* | 9/2017 | Villa-Real | B60S 1/488 |
| 2017/0259789 A1* | 9/2017 | Mcandrew | B60S 1/528 |
| 2018/0015907 A1* | 1/2018 | Rice | B60S 1/56 |
| 2018/0086316 A1* | 3/2018 | Trebouet | B08B 3/08 |
| 2018/0265048 A1* | 9/2018 | Schmidt | B60S 1/542 |
| 2018/0272998 A1* | 9/2018 | Schmidt | B08B 3/02 |
| 2018/0272999 A1 | 9/2018 | Giraud et al. | |
| 2019/0077378 A1 | 3/2019 | Giraud et al. | |

FOREIGN PATENT DOCUMENTS

| | | |
|---|---|---|
| JP | 2017532248 A | 11/2017 |
| JP | 2018528898 A | 10/2018 |
| JP | 2019509932 A | 4/2019 |
| KR | 10-2010-0062700 A | 6/2010 |
| KR | 101337864 B1 | 12/2013 |
| WO | 2017045832 A1 | 3/2017 |
| WO | 2017157739 A1 | 9/2017 |
| WO | 2017-191033 A1 | 11/2017 |

OTHER PUBLICATIONS

International Search Report and Written Opinion for Application No. PCT/US2018/065650 dated Apr. 12, 2019.
Notice of Reasons for Rejection for Japanese Patent Application No. 2020-531730 dated Jun. 18, 2021.
The Extended European Patent Search Report for European Patent Application No. 18895111.5, dated Jul. 30, 2021.

* cited by examiner

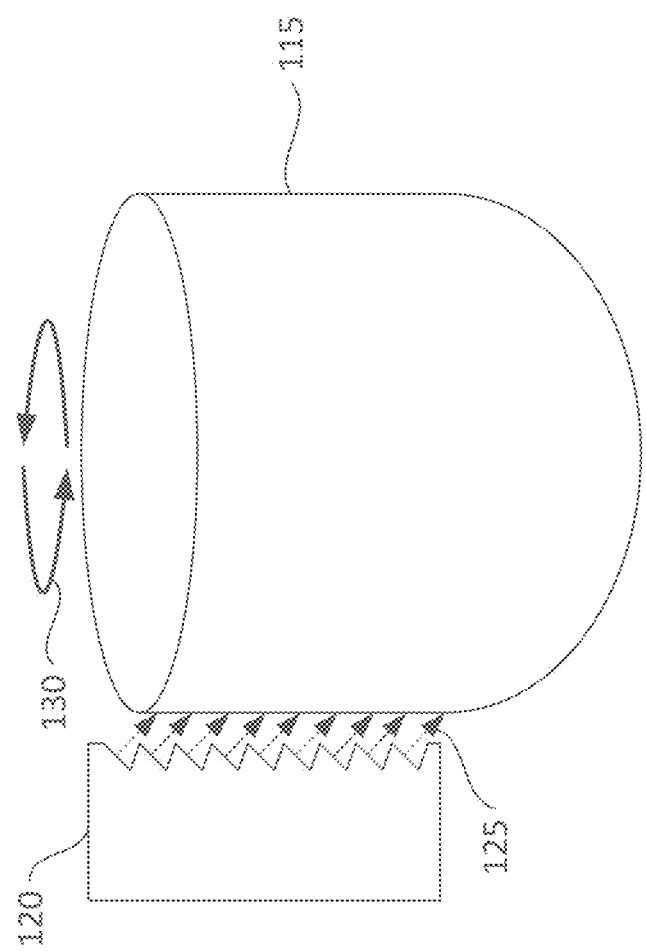
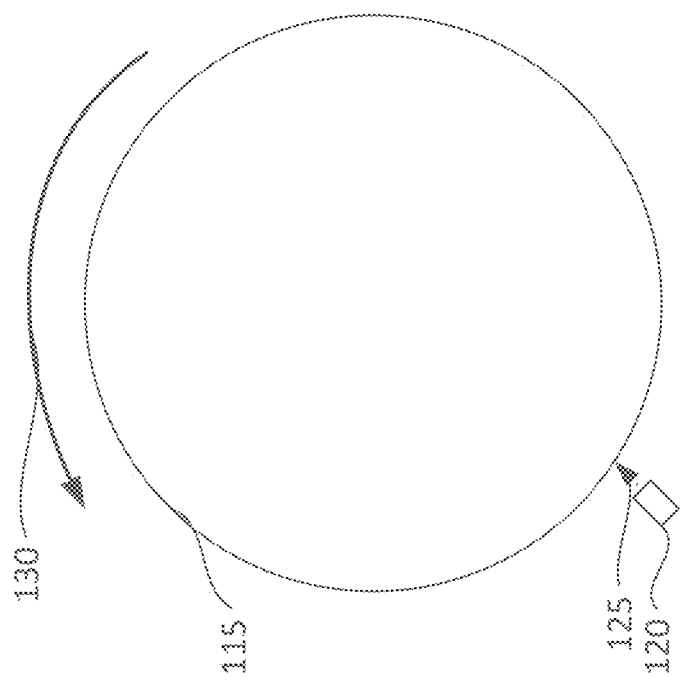

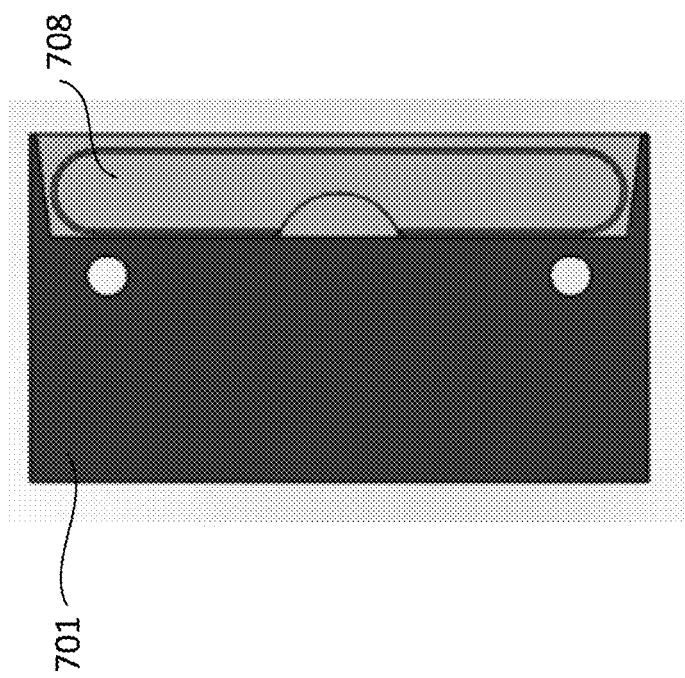
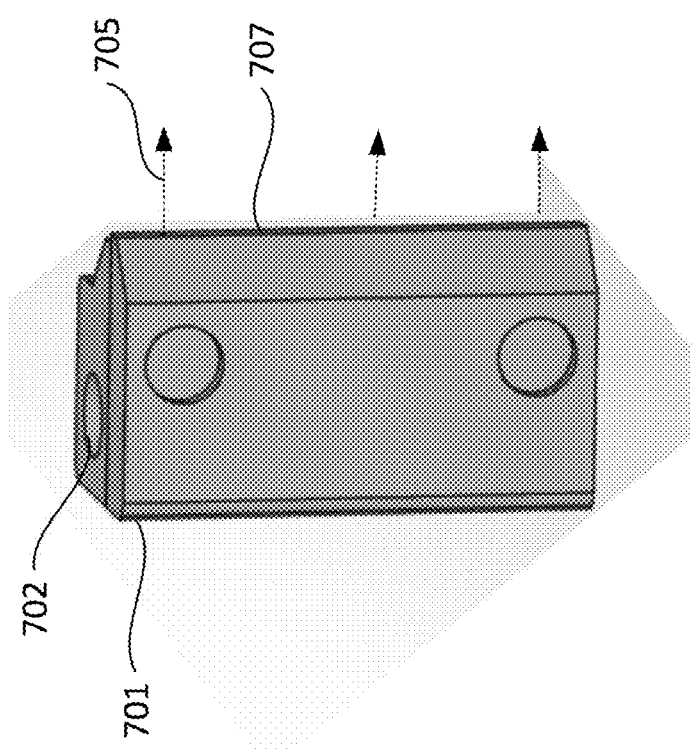
FIGURE 7B
FIGURE 7A

AIR KNIFE FOR SENSOR CLEARING

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, condensation, etc., which can cause a buildup of debris and contaminants on these sensors. Typically, the sensors include a cover to protect the internal sensor components of the sensors from the debris and contaminants, but over time, the cover itself may become dirty. As such, the functions of the sensor components may be impeded as signals transmitted and received by the internal sensor components are blocked by the debris and contaminants.

SUMMARY

This technology generally relates to a system for clearing sensors. The system may comprise an air knife (i.e., a clearing device), a sensor cover, and a sensor motor. The sensor cover may be configured to house one or more sensors. The motor may rotate the sensor cover. The air knife may be configured to clear the sensor cover of debris by providing a pressurized stream of fluid against the sensor cover as the sensor motor rotates the sensor cover.

In some embodiments the air knife may include an input for receiving the pressurized stream of fluid and an output section for providing the pressurized stream of fluid against the sensor cover.

In some embodiments the system may include a blower, wherein the blower provides the pressurized stream of fluid to the input of the air knife. In some instances a heater may be disposed between the air knife and the blower, wherein the heater heats the pressurized stream of fluid.

In some embodiments the system may include a nozzle configured to project a cleaning solution onto the sensor cover. In some instances a pump may provide the nozzle with the cleaning solution. In certain instances the nozzle may be connected to the pump via a conduit. In some embodiments a pump may provide the air knife with a cleaning solution.

In some embodiments the air knife may be configured to be positioned during operation such that the air knife is outside of a field of operation of the one or more sensors. In certain instances, the air knife may be positioned within the sensor cover, outside of a field of operation of the one or more sensors. In some embodiments the air knife is positioned within a body of a vehicle, outside of a field of operation of the one or more sensors.

In some instances the air knife may include an output channel, wherein a plurality of segments separate portions of the output channel. In certain embodiments each of the plurality of segments are formed from shelves and separator strips positioned along the output channel. In some instances the shelves are angled downward relative to the ground. In some embodiments the shelves are contoured such that each shelf is angled relative to portions of the sensor cover.

In some embodiments the system may include a monitoring sensor, wherein the monitoring sensor is configured to detect the drag caused by the pressurized stream of fluid against the sensor cover.

In some instances the system may comprise a monitoring sensor, wherein the monitoring sensor is configured to adjust the speed of the sensor motor to compensate for the drag.

In some instances, each of the plurality of segments are formed from separator strips positioned in the output channel. In some instances, the separator strips are angled downward relative to the face of the air knife.

In some instances, a plurality of shelves are positioned within the air knife. In some instances, the plurality of shelves are contoured such that the pressurized fluid stream exits the plurality of shelves with a major velocity component angled downward relative to the face of the air knife.

In some embodiments system may include a second air knife.

In some instances the air knife may be configured to clear the sensor cover by providing the pressurized stream of fluid against the sensor cover ion a downward direction relative to the ground.

In some embodiments the system may include a vehicle, wherein the sensor cover is mounted to the vehicle.

BRIEF DESCRIPTION OF THE DRAWINGS

The present technology is illustrated by way of example, and not by way of limitation, in the figures of the accompanying drawings in which like reference numerals refer to similar elements including:

FIGS. 1A and 1B are illustrations of a sensor and air knife configuration in accordance with aspects of the disclosure.

FIG. 7A is an illustration of an exterior view of a full stream air knife in accordance with aspects of the disclosure.

FIG. 7B is an illustration of an interior view of a full stream air knife in accordance with aspects of the disclosure.

DETAILED DESCRIPTION

Figure 2:
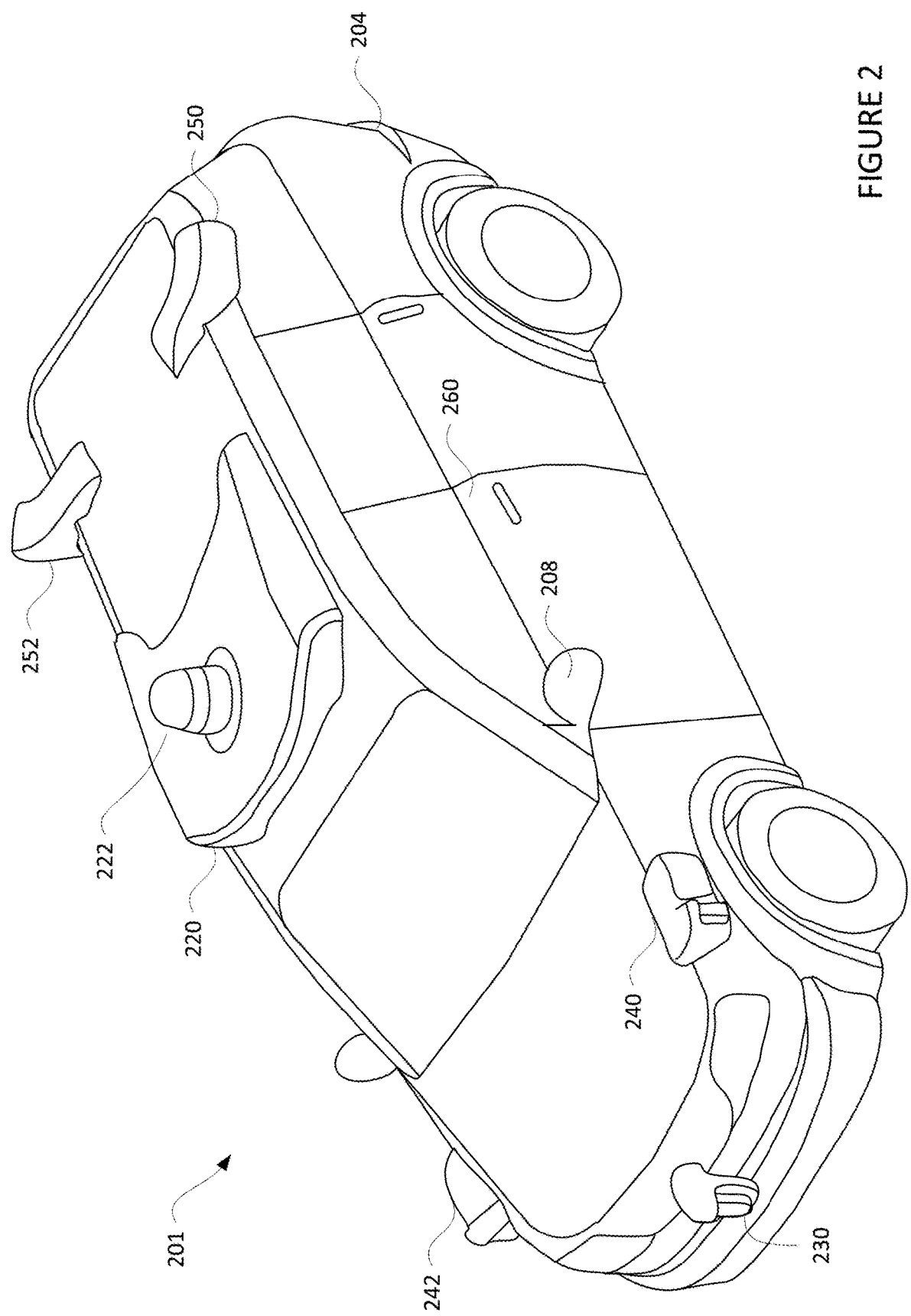
FIG. 2 shows a sensor cover window in accordance with aspects of the disclosure.

This technology relates to clearing sensors of debris and contaminants to assure adequate operation. Sensors, such as sensors on the exterior of a vehicle, may include a cover to protect the internal sensor components from the debris and contaminants such as dirt, rain water, snow, dust, ice, condensation, etc., but the cover itself may become dirty over time as debris and contaminants buildup on the cover. As such, the functions of the internal sensor components may be impeded as signals transmitted and received by the internal sensor components may be blocked by the debris and contaminants. To address these issues, debris may be cleared from a sensor by applying a stream of fluid against the cover with an air knife. As an example, as shown in FIGS. 1A and 1B a sensor cover 115 of a sensor 100 may be rotated in a first direction 130, while air knife 120 applies a stream of pressurized fluid 125 (represented by arrows) against the sensor cover 115 to blow away the debris built up on the cover.

A vehicle sensor may be comprised of internal sensor components, a cover for housing the internal sensor components, and a cover window. The cover window may be constructed at a specific location on the sensor cover and the internal sensor components may transmit and receive one or more signals through the cover window.

The sensor may be attached to a motor via a sensor shaft. In this regard, a first end of a sensor shaft may be attached to a first motor and the opposite end of the sensor shaft may be connected to the sensor and sensor cover. Upon the first motor rotating the sensor shaft, the sensor cover, or the entire sensor may also rotate.

The air knife may be part of an air knife system composed of one or more components, such as a heater, blower, pump, and nozzle. In this regard, the air knife may be connected, via a series of conduits and interconnects, to each of the aforementioned components. Each component may assist the air knife in removing debris and contaminants from sensor covers. For instance, the blower may generate and output a pressurized fluid through a conduit and into the air knife. The pressurized fluid may be output by the air knife to remove contaminants and debris from a sensor cover.

The heater may warm the pressurized fluid prior to its arrival at the air knife. In this regard, the heater may be positioned such that it receives the pressurized fluid and heats it prior to passing it onto the air knife. The pressurized fluid may assist the air knife in removing debris and contaminants susceptible to warm fluids, such as ice, snow, and/or condensation built up on the sensor cover.

The air knife system may include a cleaning section which may deliver a cleaning solution to the sensor cover to loosen and/or otherwise assist in removing the debris and contaminants. In this regard, the cleaning selection may pump, through a pump, a cleaning solution such as water or detergent. A nozzle may be connected to the pump, such that the pumped cleaning solution is received by the nozzle and subsequently projected onto the sensor cover.

The sensor cover may be rotated by the sensor motor while the air knife blows off debris and contaminants on the surface of the sensor cover. In this regard, as the motor rotates the sensor cover the air knife may blow a pressurized fluid at the sensor cover, such as in a downward direction relative to the top of the sensor cover, thereby causing a downward force to be applied against the sensor cover towards the ground. The downward force may cause debris and contaminants on the exterior of the sensor cover to be pushed progressively to the bottom of the cover.

The air knife may be positioned such that the pressurized fluid applied by the air knife makes sufficient contact with the sensor cover, but the air knife remains outside of the field of operation of the sensor. In some instances, the air knife may be set within the sensor housing and/or vehicle. Similarly, the nozzle may also be positioned outside of the range of operation (or field of view) of the sensor.

The air knife may be configured such that the pressurized fluid output from the air knife is directed in a particular direction out from the output section of the air knife. In this regard, the output of the air knife may be configured such that the pressurized fluid is released from the entire face of the output section or in sections spread across the face of the output section. The segments may be formed by one or move separator strips. The number of segments may be based upon the number of the separator strips within the segmented air knife. In some instances, the separator strips of a segmented air knife may be directed downward relative to the sensor cover. Angled or otherwise contoured steps or shelves in the housing may direct the fluid downward as it exits the air knife's face. In this regard, as the pressurized fluid travels through a segment of the segmented air knife, it is directed downwards without requiring the segmented air knife to be tilted.

While certain aspects of the disclosure are particularly useful in connection with specific types of vehicles, the vehicle may be any type of vehicle including, but not limited to autonomous and semi-autonomous, as well as manually driven and/or operated, cars, trucks, motorcycles, busses, boats, airplanes, helicopters, lawnmowers, recreational vehicles, amusement park vehicles, farm equipment, construction equipment, trams, golf carts, trains, and trolleys. Moreover, the aspects of the disclosure may be useful in connection with objects other than vehicle's, such as wearable sensors, telephones, and other such objects which are subjected to debris and contaminants.

The features described herein may allow for continued use of a sensor even when the sensor's cover becomes dirty or wet due to the buildup of debris and/or contaminants By doing such, the sensor may continue operation without interruption or the need for an individual to manually clean the sensor, as the air knife may continually clean the sensor cover or clean the sensor cover when needed. As such, the vehicle may continually operate in environments which produce a lot of debris and contaminants, such as outdoors in the rain or snow or at construction sites or off-road locations. Moreover, the features described herein may clear sensor covers with irregular shapes or faceted surfaces, where other objects, such as wipers cannot reach. Thus, the features described herein may remove the need for a wiper to wipe debris and/or contaminants from the sensor's cover, resulting in fewer moving parts to clear the sensor cover. Additionally, the features described may clear the sensor without generating wiping noise, such as generated by a wiper blade rubbing on a sensor cover.

A vehicle may have one or more sensors to detect objects external to the vehicle such as other vehicles, obstacles in the roadway, traffic signals, signs, trees, etc. For example, the vehicle 201, as shown in FIG. 2, may include sensors, such as sensor 100 in FIGS. 1A and 1B. Such sensors may include lasers, sonar, radar, cameras and/or any other detection devices that capture images and record data which may be processed by computing devices within the vehicle. The vehicle's sensors, such as LIDAR, radar, cameras, sonar, etc. may capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to objects when needed.

The sensors may be arranged around the vehicle's exterior or interior. For example, housings 230, 240, 242, 250, 252 may include, for example, one or more LIDAR devices. The sensors may also be incorporated into the typical vehicle components, such as taillights/turn signal lights 204 and/or side view mirrors 208. In some instances a laser, radar, sonar, camera or other sensors may be mounted on the roof, such as in housing 222, attached to mount 220.

Figure 3:
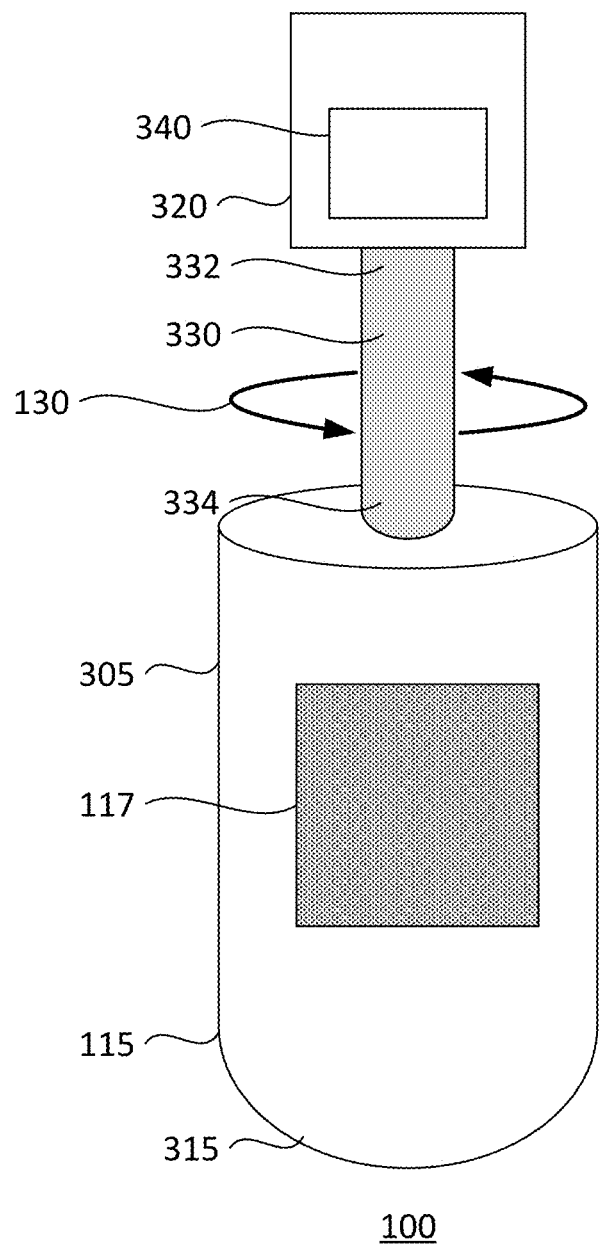
FIG. 3 shows a sensor attached to a motor in accordance with aspects of the disclosure.

A vehicle sensor, such as sensor 100, may be comprised of internal sensor components, a cover for housing the internal sensor components, and a cover window. The cover window may be constructed at a specific location on the sensor cover and the internal sensor components may transmit and receive one or more signals through the cover window. The cover of the sensor may be configured in various shapes and sizes. For instance, as shown in FIG. 3, the sensor cover 115 may be configured such that it has a domed shaped portion 315 with a side wall 305 in the shape of a frustum. The sensor cover 115 may be comprised of materials such as aluminum, magnesium, steel, plastic, glass, polycarbonate, polystyrene, acrylic, polyester, etc.

In some instances, the sensor cover may not completely cover the sensor. In this regard, the sensor cover may cover only a portion of the internal sensor components, while uncovered portions of the internal sensor components may be within a vehicle, such as vehicle 201, or open to the environment external to the sensor. The sensor cover may include one or more openings to the external environment or to the vehicle.

The cover of the sensor may include a cover window through which the internal sensor components may transmit and receive signals. For instance, as further shown in FIGS. 1A and 1B, the entire side wall of the sensor cover 115 may be constructed as a cover window, to allow signals to penetrate the sensor cover 115. Although the entire side wall is shown as being the cover window, in some instances only a portion or portions of the sidewall may be constructed as cover windows. The cover window may be composed of the same, or different, material as the sensor cover 115. In some instances the entire sensor cover 115, or a large portion of the sensor cover, may be penetrable by the signals transmitted and received by the internal sensor components, thereby allowing the entire sensor cover 115 to function as a cover window.

The sensor may be attached to a motor via a sensor shaft. For instance, as further shown in FIG. 3, the sensor shaft 330 may include a first end 332 and a second end 334. The first end 322 of the sensor shaft 330 may be attached to a sensor motor 320 and the second end 334 of the sensor shaft 330 may be connected to the sensor 100 and sensor cover 115. In this regard, the first end 322 of the sensor shaft 332 may be attached to the sensor motor 320 via a belt, gear, chain, friction roller, etc. The sensor motor 320 may rotate the sensor shaft 330 in the first direction 130 causing the entire sensor 100 to also rotate in the first direction 130. In some embodiments the sensor shaft 330 may only rotate the sensor cover 115. The sensor 100 and sensor motor 320 may each be located internally or externally from a vehicle.

The air knife may be attached to a fluid source. For example, as shown in the example air knife system 400 of FIG. 4, a conduit 410, such as rubber or plastic tubing, may be connected on one end to an input 122 of the air knife 120. The other end of the conduit may be connected to a blower 420. The blower may include a pump, a compressor, or other source of pressurized fluid, such as canned gas. The blower may output a pressurized fluid through the conduit 410 and into the air knife 120. The air knife may then output the pressurized fluid at a particular location and in a particular direction, as discussed herein. In some instances the blower 420 may be constructed within the air knife 120.

The fluid may be any type of fluid capable of being pressurized. For instance, the fluid may be compressed and/or pressurized. For instance, the fluid may be air, helium, oxygen, nitrogen, carbon dioxide, combustion engine exhaust, or other such fluid.

A heater may be used to warm the pressurized fluid as it travels from the blower to the air knife. For example, as further shown in the example system of FIG. 4, heater 430 may be attached to conduit 410 and positioned between the air knife 120 and blower 420. In this regard, as the pressurized fluid travels from the blower 420, through conduit 410 towards the air knife 120, the heater 430 may heat the pressurized fluid. As such, the pressurized fluid may be heated and, when output by the air knife 120, the heated, pressurized fluid may be sprayed onto the sensor cover. In this regard, debris and contaminants such as ice, snow, and/or condensation built up on the sensor cover may be melted as well as blown off. In some instances, a cooler (not shown) may be used to cool the pressurized fluid prior to being output by the air knife 120.

Figure 4:
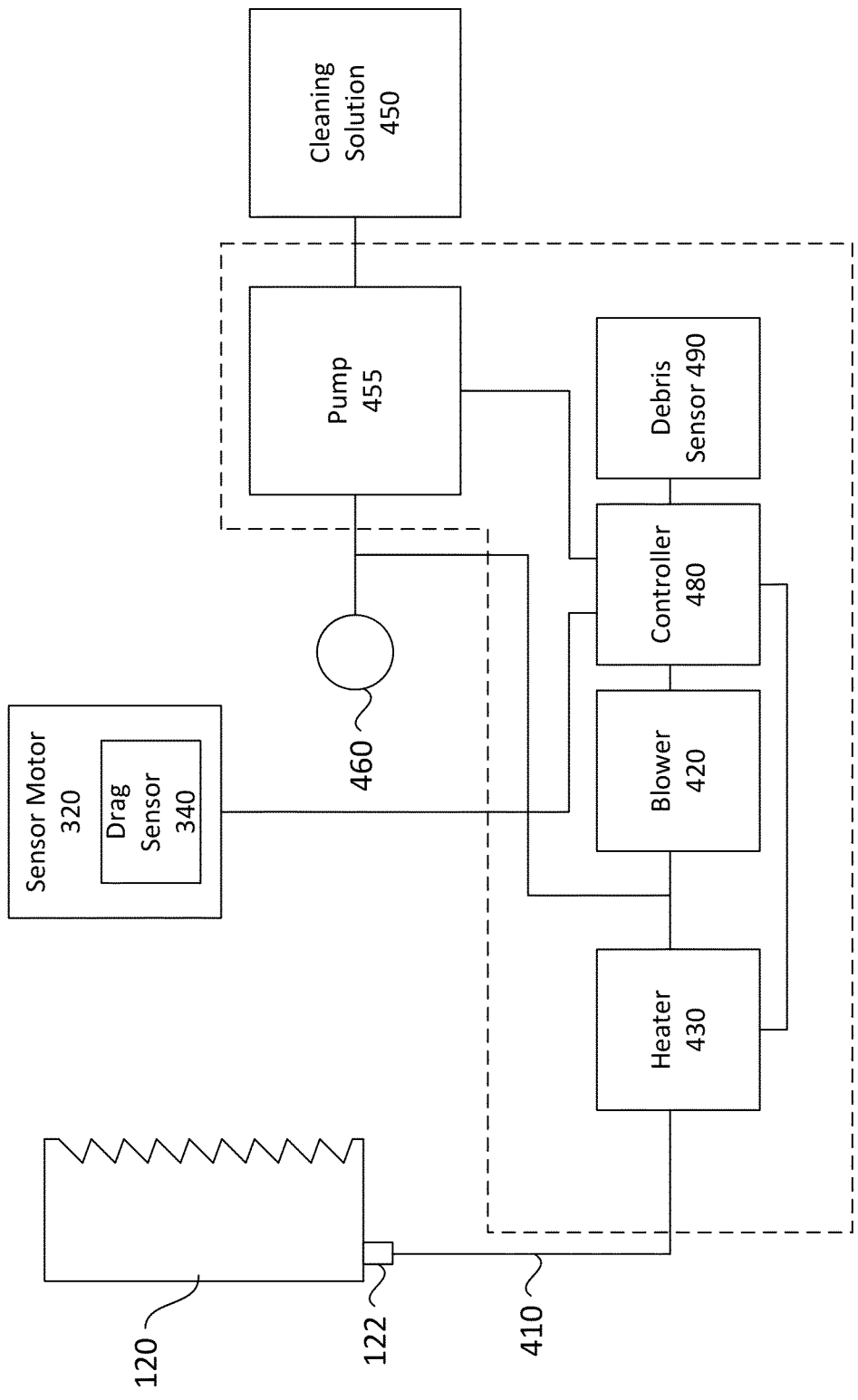
FIG. 4 is a schematic of an air knife system in accordance the disclosure.

Cleaning solution may be used to assist the air knife in removing debris and contaminants. For instance, a pump 455 may pump a cleaning solution 450 into a nozzle 460 or jet, as shown in FIG. 4. The nozzle 460 may then apply the cleaning solution 450, such as water, anti-freeze, detergent, and/or soap, onto the sensor cover 115 to assist in the removal of the debris and contaminants from the sensor cover, as further shown in FIG. 4. In some instances, the cleaning solution 450 may be pumped into the air knife 120, such that as the air knife 120 outputs the cleaning solution in addition to the pressurized fluid. The amount of cleaning solution 450 output by the nozzle 460 and/or air knife 120, as well as the timing of the application of the cleaning solution may be controlled by selectively powering the pump 455 on and off as necessary.

Figure 5:
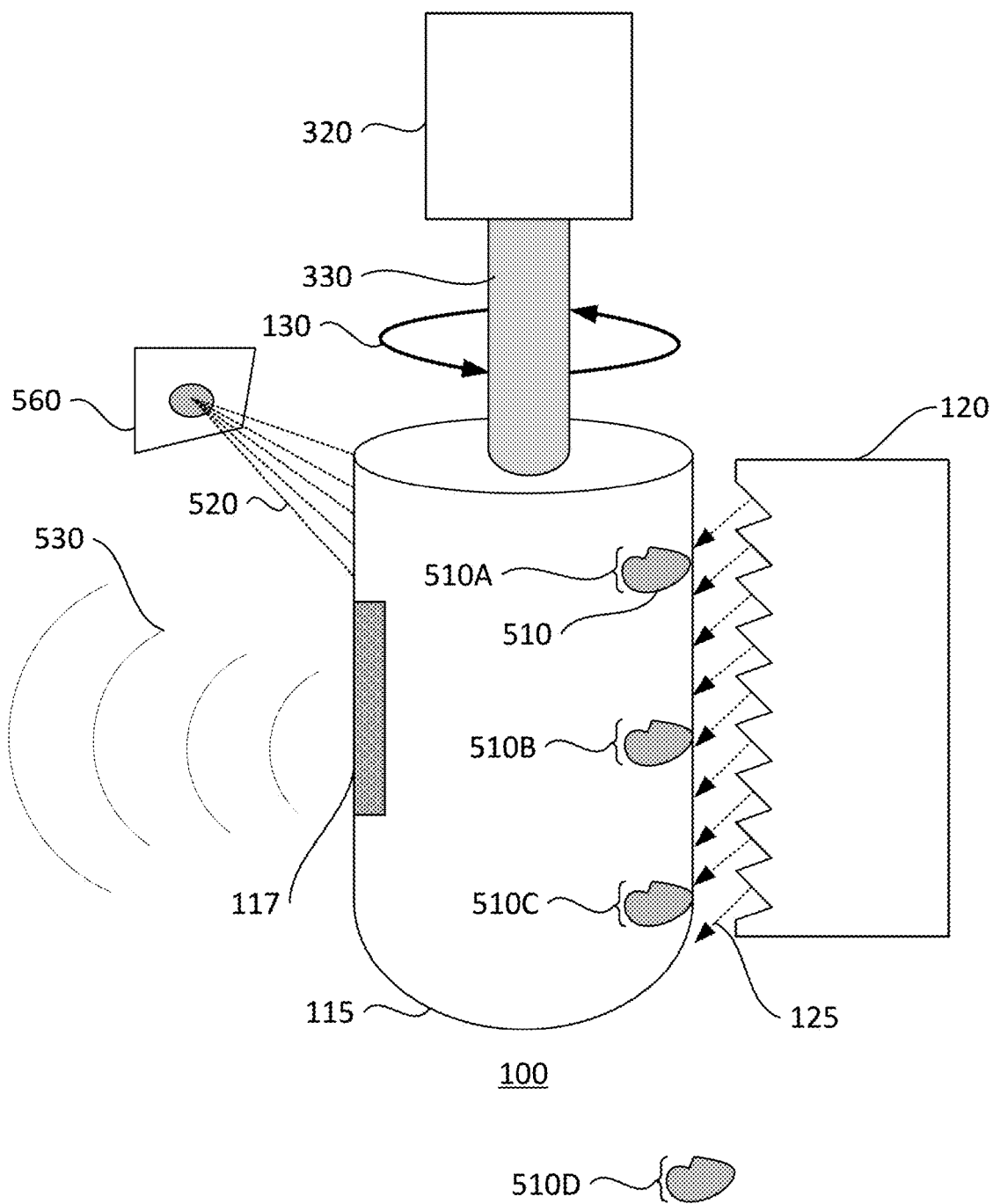
FIG. 5 is an illustration of an air knife removing debris from a sensor in accordance with aspects of the disclosure.

The motor may rotate the sensor cover while the air knife blows off debris and contaminants. For example, as shown in FIG. 5, the sensor motor 320 may rotate the sensor cover 115 in the first direction 130. As the motor rotates the sensor cover 115 the air knife may blow a pressurized fluid 125 at the sensor cover 115, such as in a downward direction relative to the top of the sensor shaft 330 causing a downward force to be applied against the sensor cover 115. In this regard, pressurized fluid may have a velocity of about 8 meter/sec, or more or less, as measured from about 25 mm away from a face of the air knife, or more or less, to clear a sensor window from about 4 mm, or more or less. In some instances, the pressurized fluid may enter the air knife at about 8-10 PSI, or more or less.

In addition to the downward force generated by the pressurized fluid, the rotation of the sensor cover 115 may generate additional forces on the debris such that the debris moves downward and/or off of the sensor cover.

The downward force may cause debris and contaminants on the exterior of the sensor cover to be pushed progressively to the bottom of the sensor cover. For instance, as further shown in FIG. 5, contaminant 510 may be progressively pushed to the bottom of the sensor cover by the downward force the generated by the air knife 120 applying the pressurized fluid 125 against the sensor cover 115 and/or cover window 117. In this regard, contaminant 510 may progressively move from position 510A, through positions 510B and 510C. The contaminant 510 may be ejected from the sensor cover 115, as shown by the contaminant 510 being located at position 510D. As a result, the sensor 100 may transmit signals 530 through the cover window 117, without the signals being impeded by the contaminant 510. Gravity may amplify the downward force applied on the contaminant 510. Although the air knife is described as generating a downward force relative to the sensor cover, the air knife may direct the pressurized fluid in any direction relative to the sensor cover.

The air knife may be positioned at a position and distance which minimizes the effect of the location of the air knife on the operation of the sensor. For instance, as further shown in FIG. 5, the air knife 120 may be positioned such that the pressurized fluid 125 applied by the air knife makes sufficient contact with the sensor cover 115, but outside of the field of operation of the sensor 100. In this regard, the air knife 120 may be positioned such that the signals 530 being transmitted and received by the sensor 100 are not blocked by the air knife 120. As further shown in FIG. 5, the air knife 120 may be positioned at the side opposite of where the sensor 100 transmits the signals 530.

The nozzle 560 may be positioned outside of the range of operation (or field of view) of the sensor 100. When the air knife 120 is engaged, the nozzle 560 may spray a stream of cleansing solution 520 onto the sensor cover 115. The air knife 120 may then clear the sensor cover of the debris, contaminants, and cleansing solution. Although only a single air knife 120 and nozzle 560 are shown in FIG. 5, any number of air knives and nozzles may be used.

Figure 6:
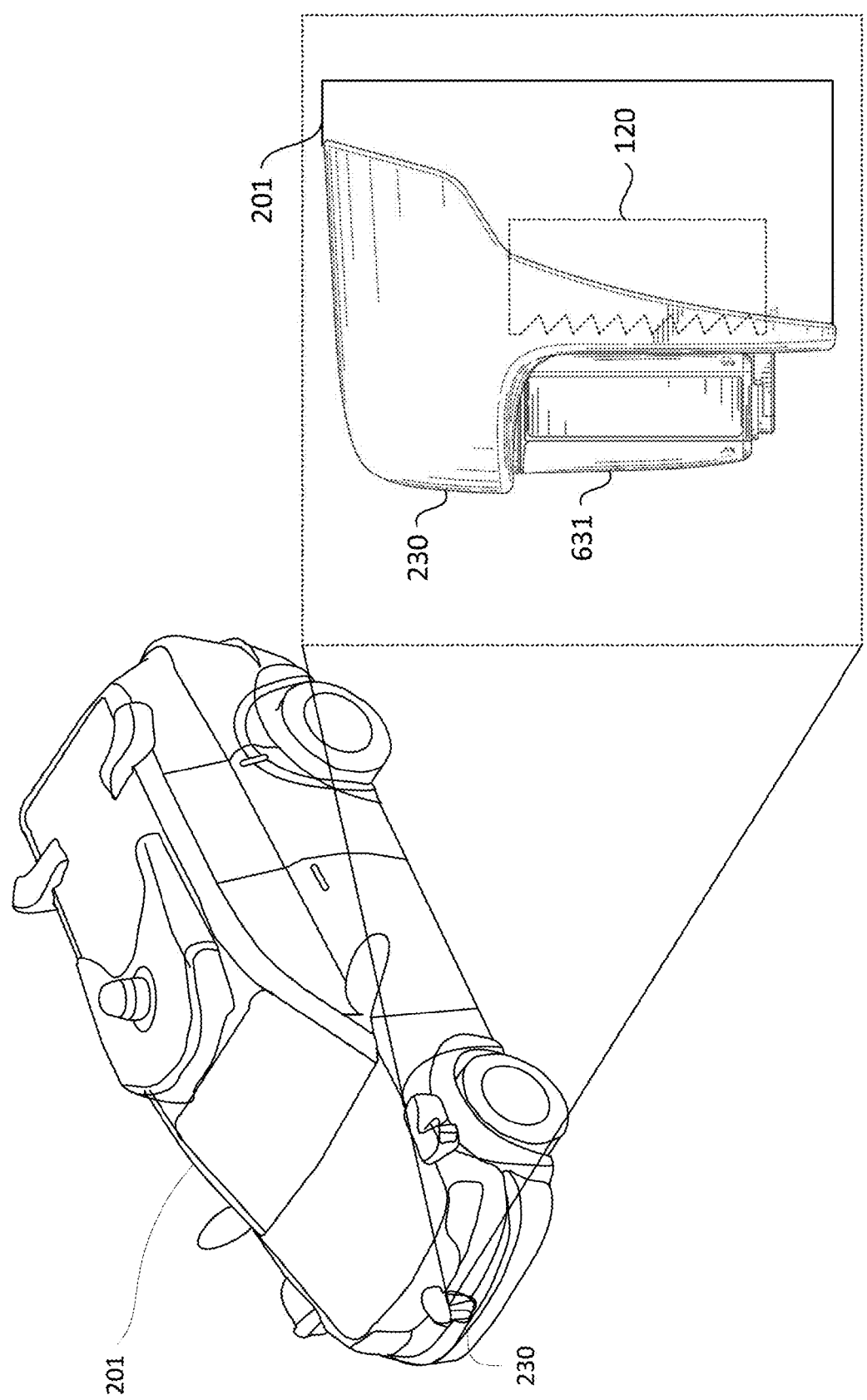
FIG. 6 is an illustration of an air knife positioned with a vehicle and behind a sensor in accordance with aspects of the disclosure.

The air knife may be set within the sensor housing and/or vehicle. For instance, FIG. 6 shows an enlarged, side view of the vehicle's 201 housing 230, in which sensor 631, which may be compared to sensor 100, is positioned. Although not shown, the sensor cover of sensor 631 may rotate. Air knife 120 of sensor 631 is positioned partially with housing 230, behind sensor 631. The rest of the air knife 120 is positioned within the vehicle 201.

The air knife may be constructed from one or more pieces of metal, plastic, or other such materials capable of withstanding high pressures, such as 8 PSI, or more or less. For instance, the air knife may be constructed from steel, aluminum, magnesium, ABS polycarbonate, polyurethane, polyethylene, polypropylene, polyamide, polyacetal, PVC, carbon fiber, etc.

The air knife may be configured such that the pressurized fluid output from the air knife is directed in a particular direction. In this regard, pressurized fluid received at the input of the air knife may be directed to the output of the air knife and, based upon the output's configuration, be directed out of the air knife. For instance, FIGS. 7A and 7B show an exterior and interior view, respectively, of a full stream air knife 701, which may be compared with air knife 120. The full stream air knife may include an input 702 and an output section 707, as shown in FIG. 7A. Pressurized fluid may be guided through an interior channel (not shown) from the input 702 to an output channel 708, as shown in FIG. 7B. The output channel 708 may be the same size, or nearly the same size as the output 707. As such, upon pressurized fluid reaching the output channel 708, the full stream air knife 701 may release the pressurized fluid as a stream 705 from the channel 708 across the entire face of the output section 707. Thus, the released pressurized fluid is sprayed perpendicular to the direction of the output section 707.

Figure 7C:
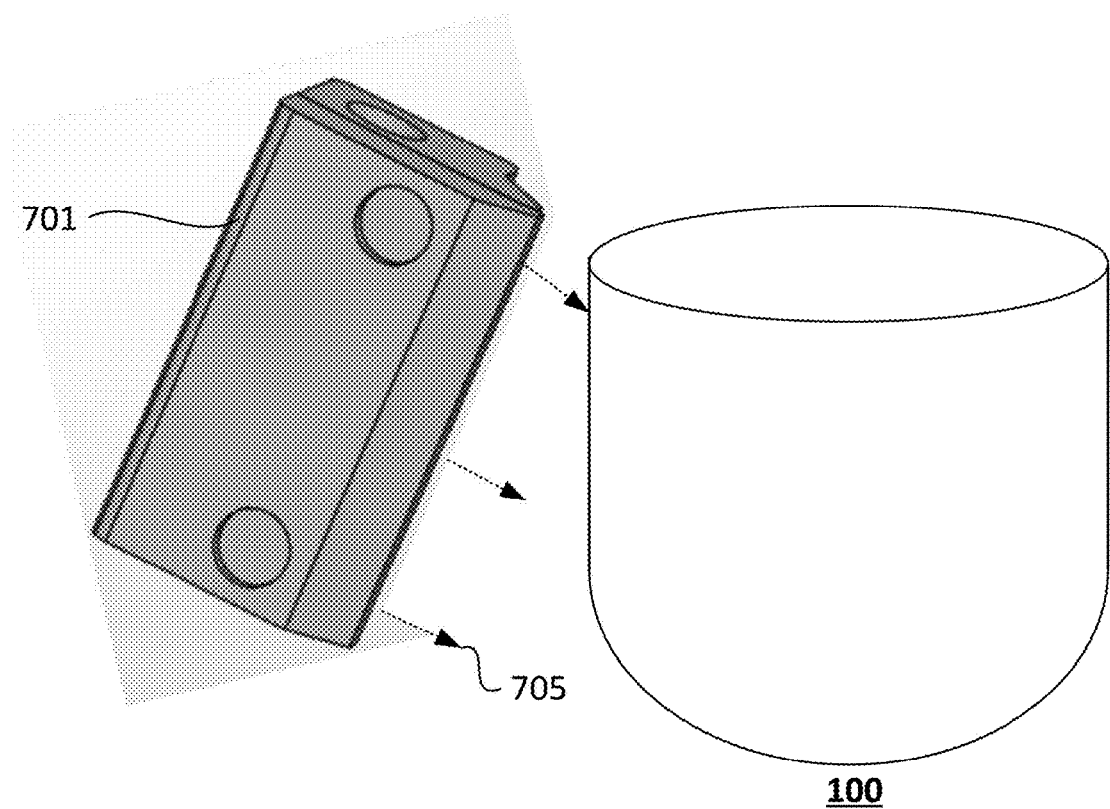
FIG. 7C is an illustration of a full stream air knife tilted relative to a sensor in accordance with aspects of the disclosure.

The full stream air knife may generate a downward force on a sensor cover by directing the released pressurized fluid in a stream having a downward direction relative to the sensor cover. In this regard, the full stream air knife 701 may be tilted in a downward direction, as shown in FIG. 7C. As such, the stream of pressurized fluid 705 travels in a downward direction relative to the sensor 100, as further shown in FIG. 7C.

Figure 8B:
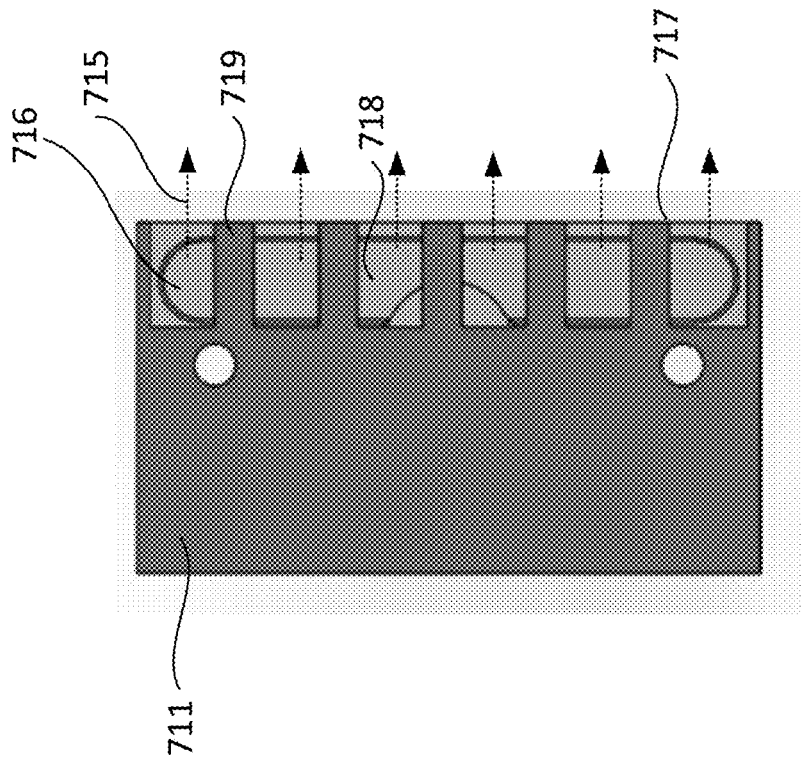
FIG. 8B is an illustration of an interior view of a segmented air knife in accordance with aspects of the disclosure.
Figure 8A:
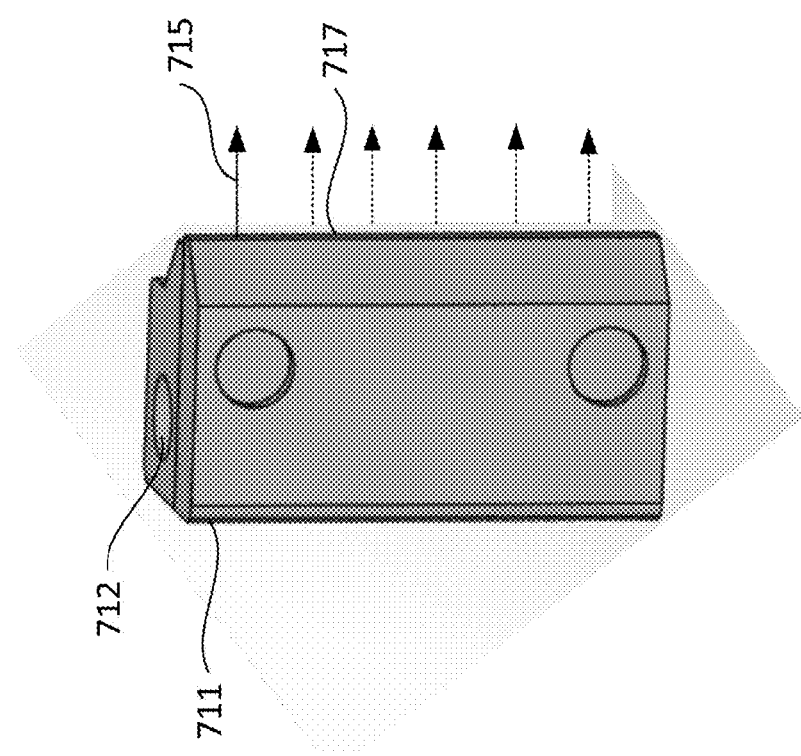
FIG. 8A is an illustration of an exterior view of a segmented air knife in accordance with aspects of the disclosure.

The air knife may be segmented. That is, the air knife may have a plurality of distinct output sections to direct the pressurized fluid as it is output. For instance, FIGS. 8A and 8B show an exterior and interview view of a segmented air knife 711. Like full stream air knife 701, the segmented air knife 711 may include an input 712 and an output section 717, as shown in FIG. 8A. Pressurized fluid may be guided through an interior channel (not shown) from the input 712 to an output channel 718, as shown in FIG. 8B. The output channel 718 may direct the pressurized fluid to a plurality of segments 716 at the output section 717.

The segments may be formed by one or move separator strips. The number of segments may be based upon the number of the separator strips within the segmented air knife. For instance, as shown in FIG. 8B, the five separator strips 719 may separate the output channel 718 of segmented air knife 711 into six segments 716. For clarity, only a single separator strip is labeled in FIG. 8B. A stream of pressurized fluid 715 may then be output from each segment 716 of the output section 717. Thus, the segmented air knife 711 may release a plurality of distinct streams 715 perpendicular to the direction of the output section 717.

As with the full stream air knife, the segmented air knife may generate a downward force on a sensor cover by directing the released pressurized fluid in a stream having a downward direction relative to the sensor cover by being tiled in a downward direction relative to the sensor cover. However, by tilting the segmented air knife 711 and full stream air knife downward, additional space is required to mount the respective air knives. Moreover, the lower portion of the pressurized fluid (i.e., the portion of pressurized fluid output from the portion of the air knife further away from the sensor cover,) may produce a downward force on the sensor cover which is lower than the downward force produced due to the, opposite, upper portion of the pressurized fluid (i.e., the portion of pressurized fluid output from the portion of the air knife closer to the sensor cover,) due to dispersion of the pressurized fluid over the larger distance to the sensor cover.

Figure 9A:
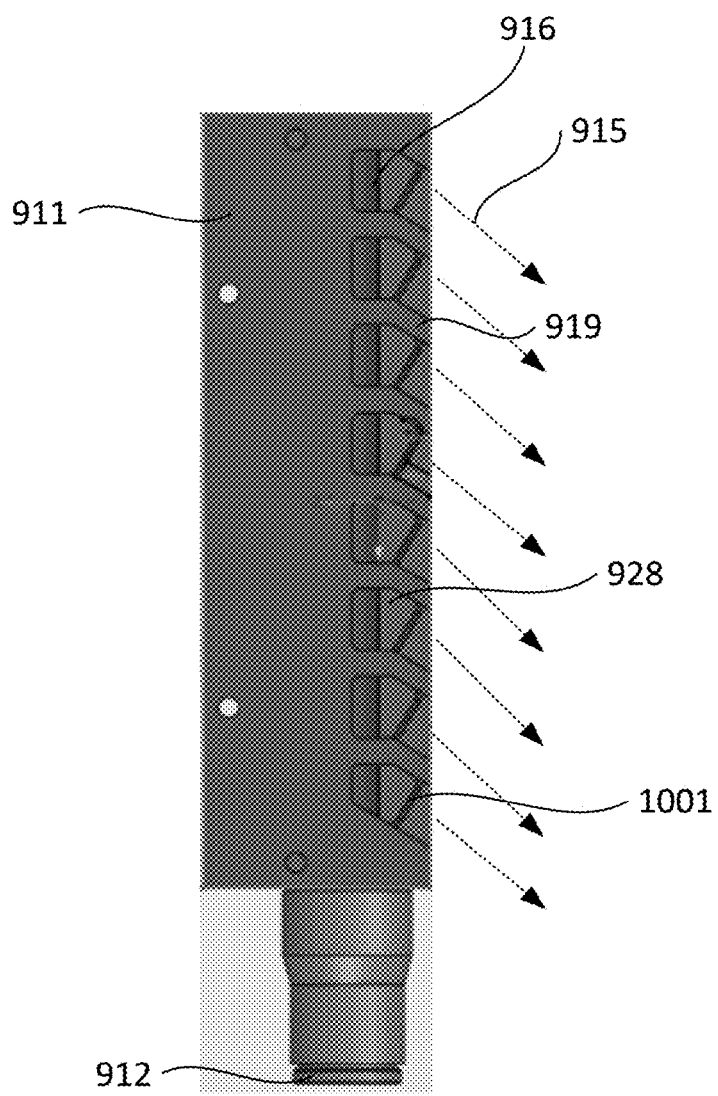
FIG. 9A is an illustration of an interior view of a segmented air knife with shelves and separator strips in accordance with aspects of the disclosure.

To reduce the amount of space an air knife requires, while still allowing the air knife to deliver the pressurized fluid such that a uniform or nearly uniform downward force is generated on a sensor cover, the shelves (described herein) and separator strips of a segmented air knife may be directed downward relative to the sensor cover. In this regard, as the pressurized fluid travels through a segment of the segmented air knife, it is directed downwards without requiring the segmented air knife to be tilted. For instance, a segmented air knife 911 with angled shelves 1001 and separator strips 919, which may be used in conjunction with, or in place of air knives 701, 711, 120, etc., is shown in FIG. 9A. In this regard, the separator strips 919 are angled downward. Pressurized fluid received at input 912 may be forced into respective portions of the output channel 928 associated with each segment 916.

Figure 9B:
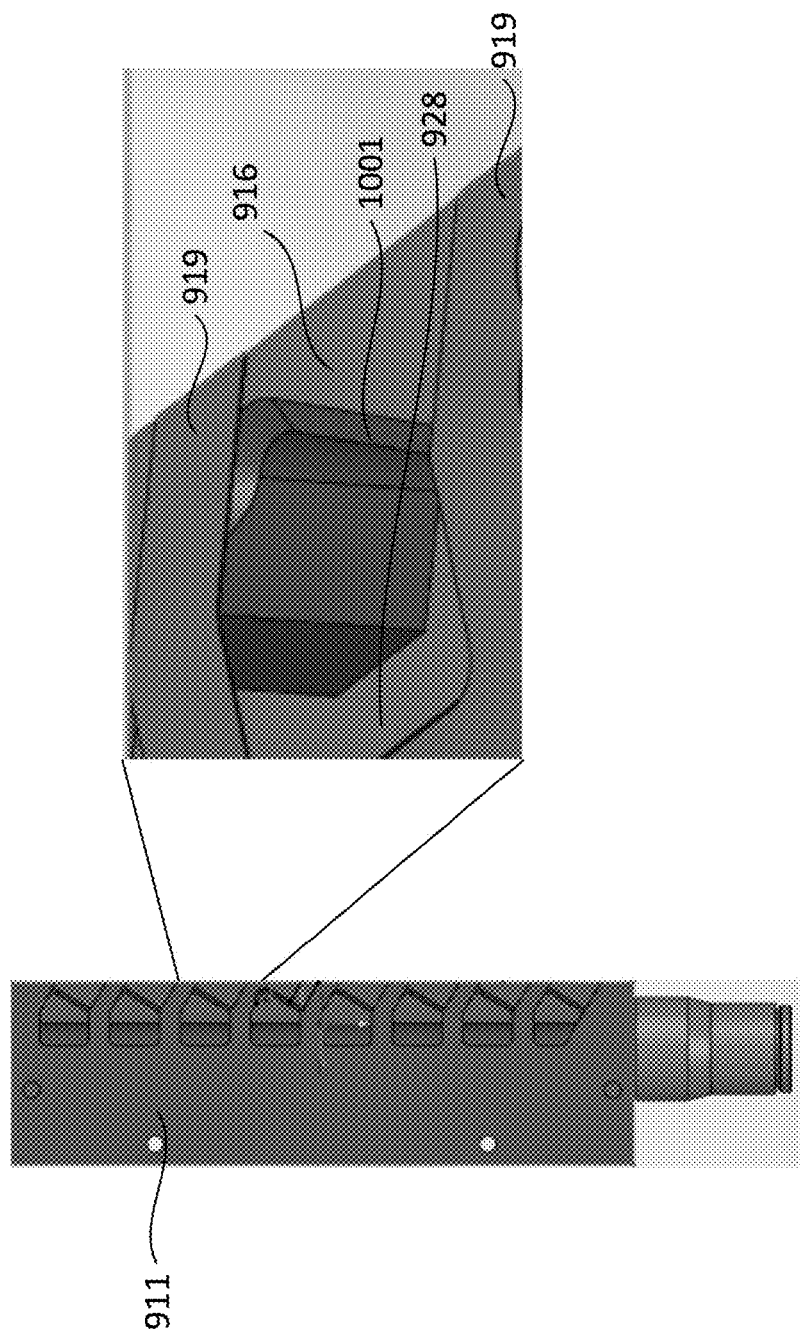
FIG. 9B is an enlarged view of a segment of segmented air knife with separator strips and shelves in accordance with aspects of the disclosure.

The output channel may be configured to improve the flow of the pressurized fluid as it exits the segmented air knife. In this regard, shelves may be constructed such that pressurized air which would normally exit a segment is blocked and redirected downward. For instance, FIG. 9B illustrates an enlarged view of a segment 916 of segmented air knife with angled separator strips 919. As seen in the enlarged view, the segment 916 is formed between separator strips 919. The output channel 928 of segment 916 includes a shelf 1001. The shelf may be contoured such that at the shelf 1001 and other shelves (which are unlabeled for clarity) may be contoured downward, such as at portion 1022 shown in FIG. 10, or in another direction to control the direction of the pressurized fluid as it exits the segmented air knife. In this regard, the shelves may be contoured such that the pressurized stream of fluid exits them with a major velocity component angled downward relative to a face of the segmented air knife.

The pressurized fluid may be emitted out of each segment as a pressurized stream 915. As the angles of the shelves 1001 are downward, the pressurized stream 915 released from each segment is directed downward without the need to tilt the segmented air knife. The shelves as well as the separator strips 919 may be angled downward to direct the pressurized fluid in that direction as well. A velocity differential may be formed along the shelf due to the varying flow path length along a gap above the shelf. Thus, air leaving at the top of the shelf may experience less pressure drop than the air leaving at the bottom. The velocity differential created by the shelf geometry, in addition to the angled separator strips 919, may cause a shear gradient that bends the pressurized fluid downward as it exits the segmented air knife.

In some instances the shelves and separator strips may be directed in different directions, such as upward, left, or right, relative to a sensor cover, such as the sensor covers of sensors 100, 631, or other such sensor discussed herein, should debris and contaminants need to be blown off of the sensor cover in a direction other than downwards.

Figure 10:
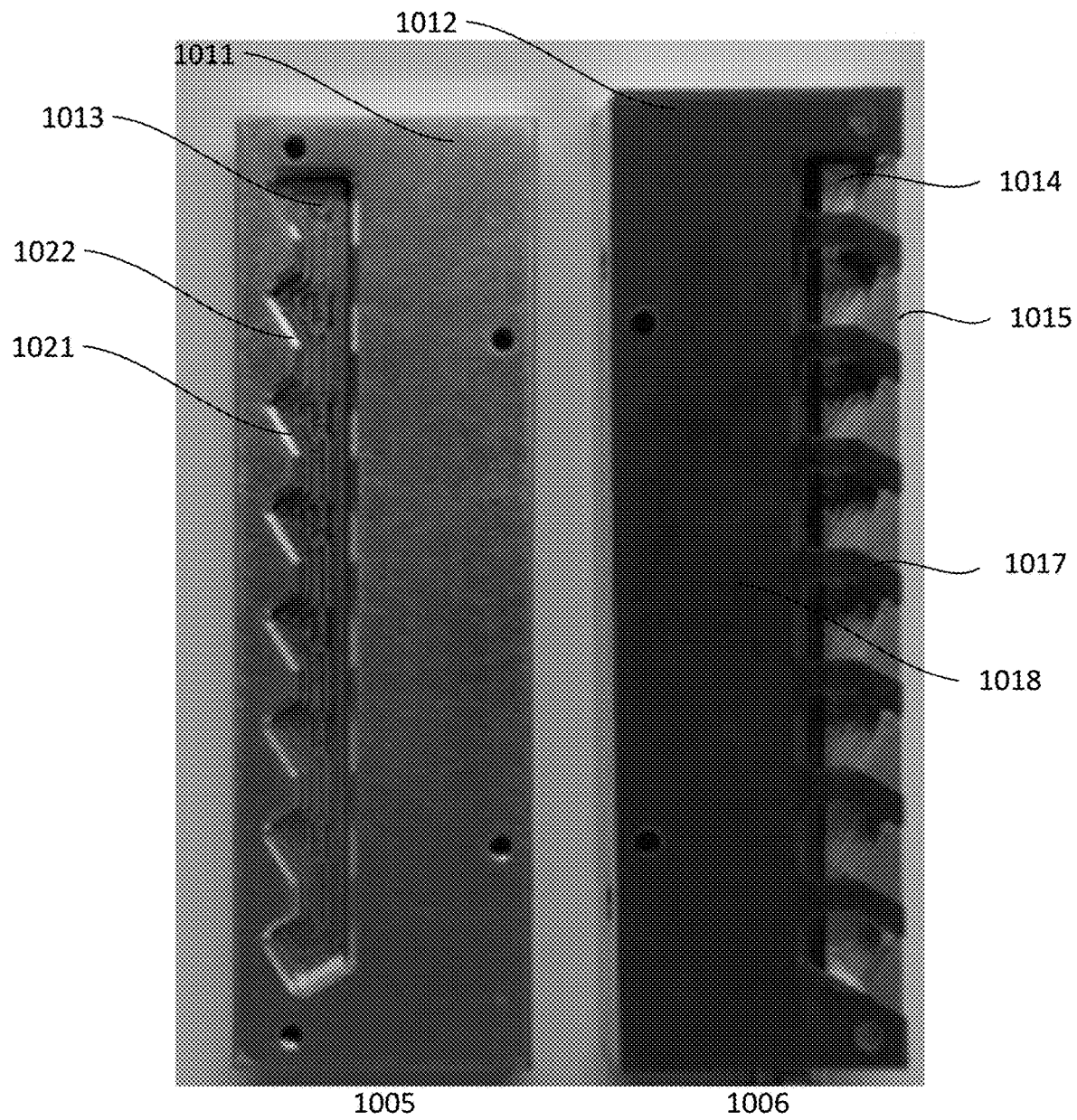
FIG. 10 is a view of a segmented air knife with angled shelves and angled separator strips in accordance with aspects of the disclosure.

The air knives may be made from nearly mirror image halves which may be flat on their mating surfaces, or constructed such that the mating surfaces contact each other when placed together. When the two halves are mated together, such as with glue, welding, an adhesive, etc., they may form a nearly closed cavity. For instance, FIG. 10 shows two halves 1005 and 1006 with mating surfaces 1011 and 1012, respectively. When mated together, portions 1013 and 1014 of the two halves may form a cavity. The two halves may include shelves, such as shelf 1021 integrally formed in the air knife. For illustration clarity, only a single shelf is labeled. In some instances the shelves may be constructed from other components and positioned within each half, or only a single half.

To create outlet slits 1015 through where the pressurized fluid may exit the cavity, a piece of thin spacer material 1018, such as 0.002 inches thick, or more or less, may be sandwiched between the two halves 1005 and 1006. The spacer material may create a gap with a predefined width and spacer geometry within the air knife. The spacer material, such as polyester, plastic or other such material, may also include a predefined number of separator strips 1017 along the outlet edge of the spacer, with the separator strips positioned at predefined locations. In some instances the separator strips may be formed from a material other than the spacer material 1018 and/or integrally formed into the air knife.

The output channel of a segmented air knife may be contoured relative to the shape of the sensor cover for which it is designed to remove debris from. In this regard, the segments of the air knife may be positioned to reliably remove debris from the cover. For instance, a sensor, such rotatable sensor 1101 of FIG. 11, which may be compared to sensors 100 and 631, may have a sensor cover with a rounded bottom 1110. To improve the removal of the debris, which may migrate to the rounded bottom upon being pushed downward by upper segments 1130 of air knife 1120, which include an input, output channel, etc., as found on air knives 120, 701, 711, 911, etc. The lower segments, such as segments 1132 and 1134 may be contoured to the shape of the sensor cover 1115, which may include the features of sensor cover 115. As such, as the debris move toward the rounded base, lower segment 1132 may force the debris toward the lowest point of the sensor cover 1115, where the other lower segment 1134, of the air knife 1120 may blow the debris off of the sensor cover.

In some embodiments, a sensor may monitor the drag caused by the air knife blowing the pressurized fluid at the sensor cover. Based on the determined drag, the power to the motor rotating the sensor may be increased or decreased to assure a consistent scan speed of the sensor.

In some embodiments, a debris sensor may monitor the sensor cover. In this regard, the debris sensor may monitor the sensor cover to determine whether contaminants or debris or contaminants are present on the sensor cover 1115. Upon determining a threshold number of contaminants or debris are present on the sensor cover, the debris sensor may provide a signal to engage the air knife system 400. Upon determining the sensor cover is clear of debris, or the debris level on the sensor cover 115 is below a predetermined threshold, the debris sensor may signal the air knife system 400 to disengage. In certain instances the debris sensor may provide data to a computing device, such as a controller described herein, which may determine when to engage/disengage the air knife system 400.

Figure 11:
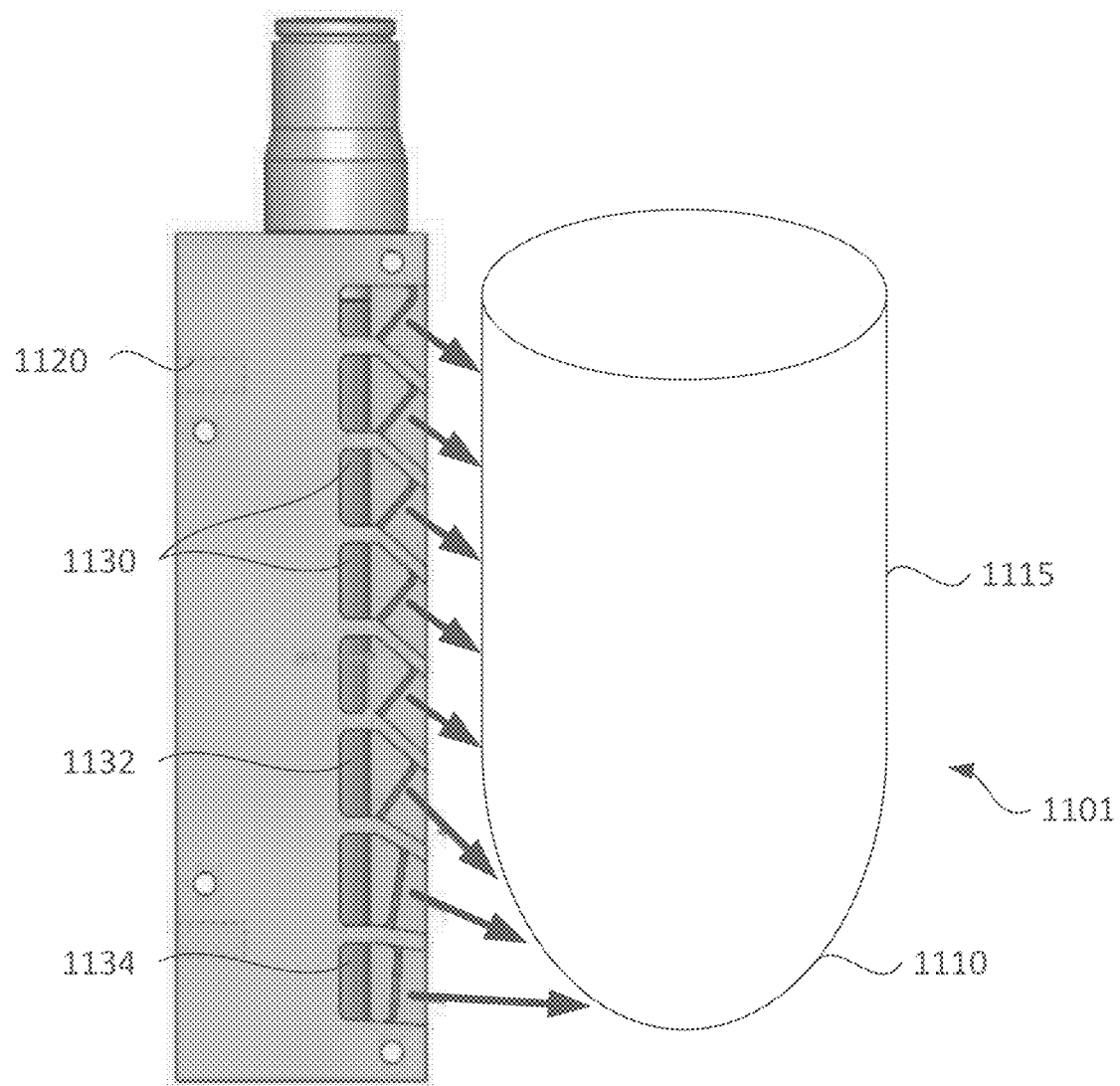
FIG. 11 is an illustration of an interior view of a segmented air knife with contoured shelves and separator strips in accordance with aspects of the disclosure.

Referring back to FIG. 4, the air knife system 400 may include a controller 480, having one or more microprocessors, processors, computer devices, etc. which may control the operation of components of the air knife system. In this regard, the controller 480 may be connected to the pump 455, heater, 430, and blower 420, as well as other components of the system, such as a debris sensor 490. Upon receiving a signal to engage, or determining that the system should engage based on data received from sensors such as the debris sensor 490, the controller 480 may trigger one or more components of the air knife system 400 to engage. For instance, the controller 480, upon the debris sensor 490 determining that a sensor cover, such as the sensor cover 1115 shown in FIG. 11, is dirty, may trigger the blower 420 to engage resulting in the air knife 120 outputting a stream of pressurized fluid on the sensor cover. In the event the sensor cover remains dirty, the controller may trigger the pump 455 to spray cleaning solution 450 onto the sensor cover 1115. Upon the sensor cover 1115 being cleared of the dirt and debris, the controller 480 may disengage the components of the air knife system. In some instances, the controller may receive ambient temperature data relative to the vehicle's exterior to determine whether the heater 430 should be engaged or disengaged during the operation of the air knife system 400. In this regard, should the ambient temperature be below a threshold, such as 40 degrees Fahrenheit, or more or less, the controller 480 may trigger the heater 430 to engage when the blower 420 is engaged.

In some instances the controller 480 may receive a signal from a manually operated input, such as a switch, button, lever, etc. In response to the received signal, the controller 480 may engage or disengage the air knife system 400.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for clearing a sensor cover housing one or more sensors, the system comprising:
   a sensor motor configured to rotate the sensor cover;
   a blower;
   a clearing device including:
      an input configured to receive pressurized fluid output from the blower, and
      an output channel including a plurality of segments, wherein the plurality of segments includes respective shelves, and
      wherein each shelf of the plurality of segments is angled so that the shelf individually controls direction of a pressurized stream of fluid exiting from the output channel to clear the sensor cover of debris or contaminants by applying the pressurized stream of fluid against the sensor cover as the sensor motor rotates the sensor cover;
   a sensor configured to determine drag caused by applying the pressurized stream of fluid against the sensor cover; and
   a controller configured to adjust power to the sensor motor based on the determined drag.

2. The system of claim 1, further comprising a heater disposed between the clearing device and the blower, wherein the heater heats the pressurized fluid.

3. The system of claim 1, wherein the clearing device is configured to be positioned during operation such that the clearing device is outside of a field of operation of the one or more sensors.

4. The system of claim 1, wherein the clearing device is configured to apply the pressurized stream of fluid against the sensor cover to progressively move the debris or contaminants to different positions of the sensor cover until the debris or contaminants is ejected from the sensor cover.

5. The system of claim 1, further comprising a second clearing device.

6. The system of claim 1, wherein each segment is formed by angled separator strips.

7. The system of claim 6, wherein a gap adjacent to each angled shelf is arranged to provide a path for the pressurized fluid within the clearing device.

8. The system of claim 7, wherein the pressurized stream of fluid bends as it exits the clearing device.

9. The system of claim 1, further comprising a vehicle, wherein the sensor cover is mounted to the vehicle.

10. The system of claim 1, further comprising:
    a debris sensor; and
    one or more processors operatively coupled with the debris sensor and the blower, wherein the one or more processors are configured to trigger the blower to output pressurized fluid when the debris sensor detects that there is a threshold number of debris or contaminants present on the sensor cover.

11. A method of clearing a sensor cover housing one or more sensors, the method comprising:
    receiving, at an input of a clearing device, pressurized fluid from a blower;
    applying, from an output channel of the clearing device, a pressurized stream of fluid against the sensor cover as the sensor cover is rotated by a sensor motor to clear the sensor cover of debris or contaminants,
    wherein the output channel has a plurality of segments with respective shelves, and
    wherein each shelf of the plurality of segments is angled so that the shelf individually controls direction of the pressurized stream of fluid exiting from the output channel to clear the sensor cover of debris or contaminants by applying the pressurized stream of fluid against the sensor cover as the sensor motor rotates the sensor cover;
    determining, by a sensor, drag caused by applying the pressurized stream of fluid against the sensor cover; and
    adjusting, by a controller, power to the sensor motor based on the determined drag.

12. The method of claim 11, wherein the pressurized stream of fluid is applied against the sensor cover to progressively move the debris or contaminants to different positions of the sensor over until the debris or contaminants is ejected from the sensor cover.

13. The method of claim 11, wherein a varying flow path is provided by a gap adjacent to the shelf to create a velocity differential for the pressurized stream of fluid within the shelf.

14. A system for clearing a sensor cover housing one or more sensors, the system comprising:
    a sensor motor configured to rotate the sensor cover;
    a clearing device configured to clear the sensor cover of debris or contaminants by applying a pressurized stream of fluid against the sensor cover as the sensor motor rotates the sensor cover;
    a sensor configured to determine drag caused by applying the pressurized stream of fluid against the sensor cover; and
    a controller configured to adjust power to the sensor motor based on the determined drag.

* * * * *